_United States Patent Office_

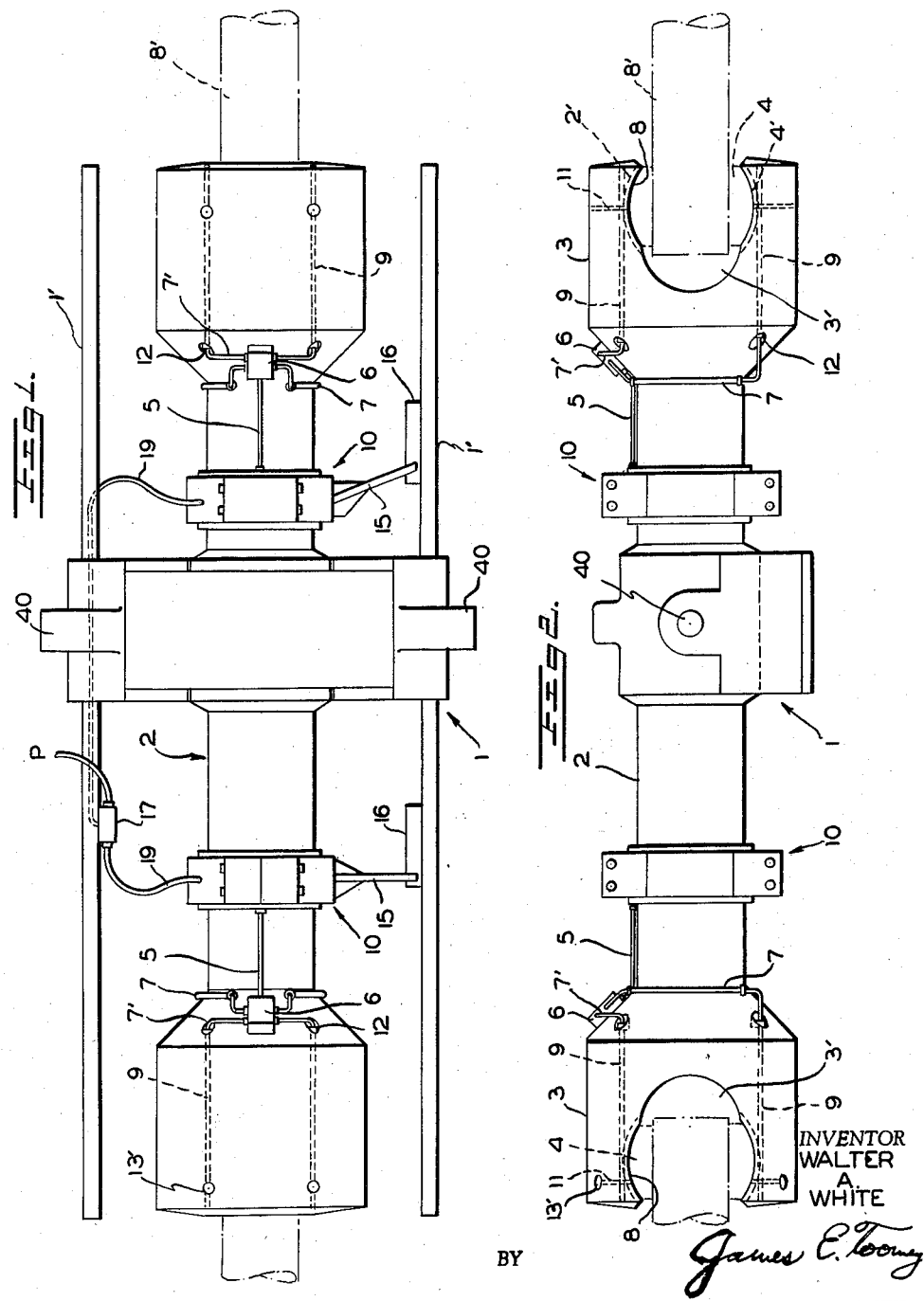

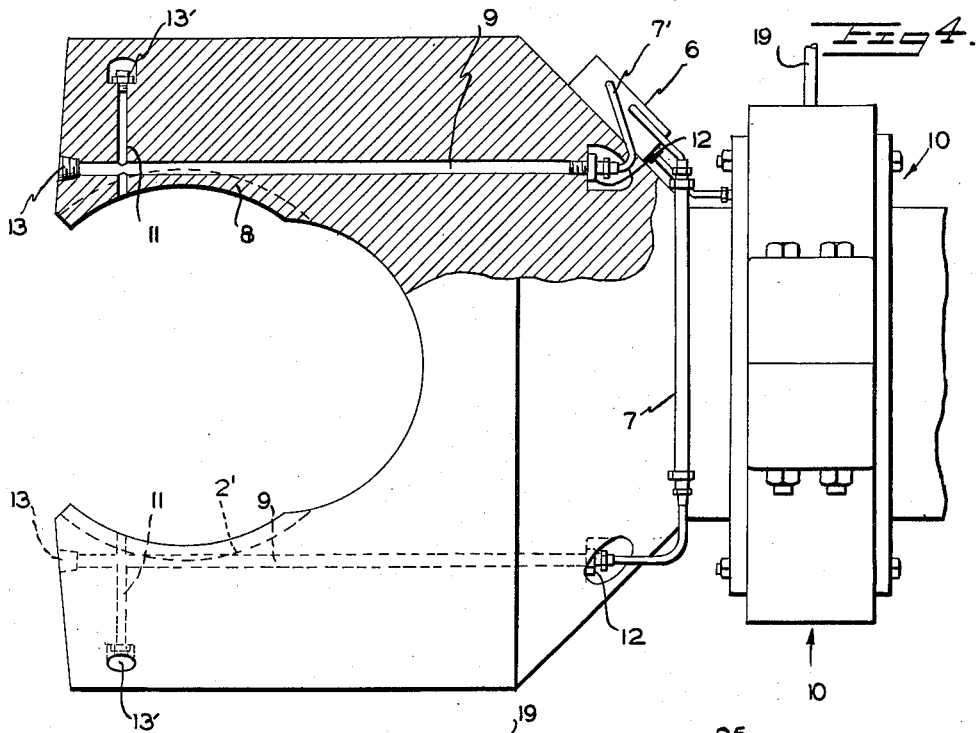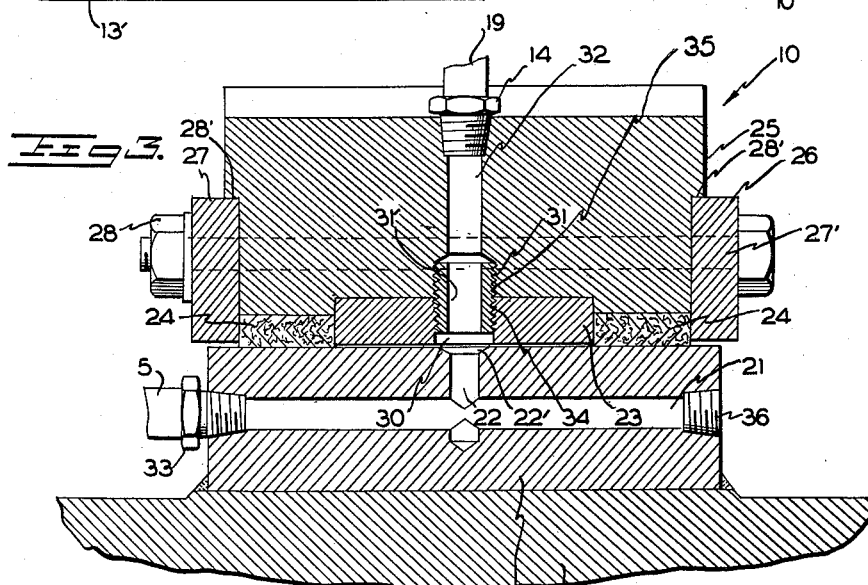

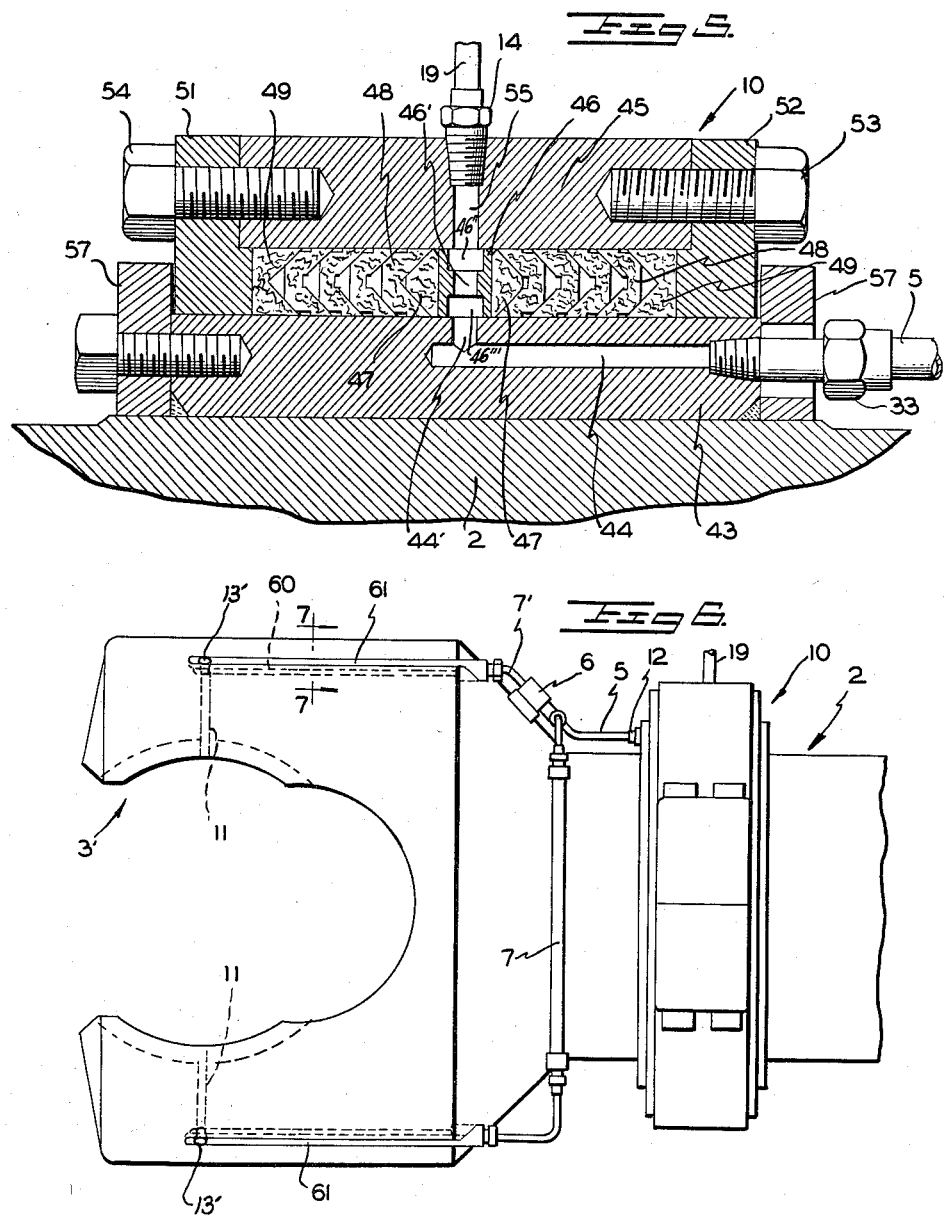

2,925,885
Patented Feb. 23, 1960

2,925,885

LUBRICATION APPARATUS

Walter A. White, Oakland, Calif., assignor to Henry J. Kaiser Company, Oakland, Calif., a corporation of Nevada Application January 11, 1956, Serial No. 558,520

11 Claims. (Cl. 184—6)

This invention relates to lubricating systems. More particularly, the invention relates to a pressure lubricating system, which may be used for lubricating shaft journals, slippers, bushings and the like from a stationary source of lubricant pressure and supply wherein the lubricating medium may be carried from the stationary source to a rotating shaft and thereafter externally of the shaft to a spindle or other element requiring substantially constant lubrication.

There are many instances in the use of heavy machinery wherein the provision of proper lubrication presents a considerable problem. For example, heavy universal joints and heavy shaft bearings, bushings and the like, require constant attention and maintenance including the provision of a sufficient amount of lubricating medium to prevent excessive wear or destruction of such elements by reason of the heavy loads imposed thereon. While many devices have been developed, such as grease cups and fittings, etc., whereby such machine elements may be lubricated, certain disadvantages arise from the use thereof. It is the purpose of the present invention to overcome such disadvantages and to provide a simple, reliable lubrication system which can be applied to existing as well as newly fabricated equipment.

Another of the principal methods relied upon in lubrication systems of the past has been the provision in a shaft of drilled, machined, or even "cast in" passages of considerable length, whereby the lubricating medium may be transferred to the passages and carried internally of the shaft to those points which require the lubricant. Such an arrangement leaves much to be desired in that considerable difficulty has been experienced in maintaining the lengthy passages free from dirt and the accumulation of foreign matter which tends to block the same because of lack of ready access to the same. It is readily apparent that should the passages become clogged, the resultant damage to that element dependent on flow of lubricant within the particular passage is severe, often necessitating extensive repair and even replacement. The accompanying expenses tend to increase production costs and reduce the effectiveness and efficiency of the machinery in which lubrication failures occur.

Even during the course of normal operation, internal lubrication systems present a considerable problem when normal wear of the machine elements requires overhaul of parts with an accompanying clean-out of the lubrication ports and the like. Since internal passages are relatively inaccessible, special tools and the like must be devised to facilitate the cleaning of the passages and oftentimes, due to exceptionally adverse conditions, an otherwise serviceable machine element must be discarded since the effective removal of accumulated foreign matter in the lubricating passages would be practically impossible, or the time required for cleaning far in excess of that which would be warranted.

Still further, many systems as are presently being used are of value only when formed as part of the original assembly and are not readily adaptable to existing machinery. Oftentimes there is no way in which internal passages may be properly machined once a part is completed.

Accordingly, it is a primary object of the instant invention to provide a lubricating system wherein the majority of the lubricating conduits and passages are located externally of the device to be lubricated and wherein those passages which are internally located are of such a length and so arranged as to facilitate cleaning with a minimum of effort and time.

Still a further object is to provide a lubricating system, wherein the elements of the system which are subject to the greatest wear may be readily "knocked down" to facilitate replacement of the parts and maximum use may be made of conventional tubing and couplings, all or most of which are located externally of the machine element which is being lubricated.

Another object of the instant invention is to provide a lubricating system which may be readily attached to existing machine elements without the necessity of expensive maching operations, or special fittings.

Still a further object of the instant invention is to provide a lubricant transfer element which will be leakproof in operation and capable of long endurance and simple maintenance.

Referring in particular to the drawings, the instant device in all of its various forms, modifications, etc., is shown as applied to a spindle such as would be incorporated between a driving source or power transmission and the driven rolls of a blooming mill or the like. However, it is to be understood that the invention is not limited solely to use in such an environment, and that the disclosed arrangement is but one of the principal applications to which the system might be put to advantage.

Considering the specific drawings:

Figure 1 is a top plan view of the spindle used to connect a suitable power transmission to an adjacent blooming mill whereby the height of or spacing between the mill rolls may be varied as desired;

Figure 2 is a side elevational view of the device disclosed in Figure 1 with certain parts not being shown for the sake of clarity;

Figure 3 is a partial sectional view of one embodiment of the instant invention;

Figure 4 is an enlarged view with parts broken away of one of the spindle heads shown in Figures 1 and 2, showing one way in which lubricating substances may be carried to the spindle head;

Figure 5 is a view similar to Figure 3 and showing a further embodiment incorporating the principles of the instant invention;

Figure 6 is an enlarged view similar to Figure 4, and showing another arrangement whereby lubricant may be carried to the spindle head, and Figure 7 is a sectional view of a portion of the spindle head shown in Figure 6, when taken along the lines 7—7 of Figure 6, and indicates one arrangement for locating a lubrication conduit adjacent the outer periphery of the spindle head.

Considering now one application of the principles of the instant invention and referring in particular to Figure 1, the lubricating system is shown as installed on a typical spindle or shaft 2 and spindle head assembly 3 used in the transmission of power from a power unit to a juxtaposed blooming mill such as is used for rolling steel, aluminum, and the like. The spindle or shaft 2 is generally rotatably mounted in a shaft support 1, which may include laterally extending elongated support bars 1'. In ordinary practice, the support 1 will include pairs of axially disposed journal or pivot members 40 whereby spindle 2, the supports 1 as well as the parallel laterally extending bar members 1' may pivot. These axially aligned journal or trunnion members 40 may be of any suitable type permitting pivotal movement of the spindle and supports. For example, a saddle type of mounting may be used. Thus, vertical adjustment of the rolls of the mill may be accomplished with no loss in connection to a suitable power source. Journaled in support 1 is the spindle 2 having spindle heads 3 affixed to the opposite extremities thereof. The outermost end of each spindle head 3 is provided with a diametrically extending slot 3' bounded by upper and lower spherical walls 8 into which are fitted a plurality of upper and lower slipper elements 4 having exterior and complimentary shaped spherical surfaces 4'. The spherical surfaces 4' of each slipper element 4 fit within a complementary shaped recess 2' in a spherical wall 8. These slipper elements in turn are usually engaged by tongue-like members 8' on the roll necks (shown in dotted lines) of the mill rolls such that a universal motion can be obtained by movement of the slippers 4 within the slot defined by spherical surfaces 8 and their slots 2'. As will be apparent from an inspection of Figure 1 and by way of example, lubricant must be provided between the spherical surfaces of the slippers 4 and the internal complementary spherical walls 8 of the spindle head 3 in contact therewith. The lubrication of such a device may advantageously be carried out by the system now to be described.

A suitable pump not shown including a reservoir is provided at a point adjacent to the supports 1'. The lubricant from the pump may pass through a conduit indicated as P to a first distribution block 17 which in turn distributes the lubricant via lines 19 to multiple points on the apparatus. For the purposes of adequately disclosing the invention only one of the installations need be described. One of the conduits 19 transmits the lubricating substance under pressure, such as grease, oil or the like, to lubricant transfer devices 10. Transfer devices 10 to be described more fully hereinafter are so arranged as to form lubricant transfer chambers wherein the lubricant from the stationary source may be transferred to the rotating spindle 2 and distributed by suitable conduit means to the points on the spindle 2 which require lubrication.

From the transfer arrangement device 10, the lubricant will pass through a conduit 5 carried by the rotating spindle 2 and rotatable therewith to an external distributing block 6. A suitable number of lines 7 and 7' receive lubricant from the distributing block 6 and convey the same to internal conduits 9. Although the conduits 9 are shown in the drawings as being located internally of the outer surface of the spindle head 3, it is obvious that they may also be affixed to the outer surfaces thereof in a manner well-known in the art. Any suitable number of conduits 7, 7' and 9 may be provided for transferring the fluid or lubricating material from the distributing block 6. In the particular installation shown, however, four such lines are provided, all of which are located in spaced radial positions on a spindle head 3.

The internal conduits 9 communicate with a series of diametrically or radially arranged ports 11 which have outlets disposed in the spherical surfaces 8 in contact with the slippers 4. Thus, it may be seen that lubricant pumped from the fixed pump P may be transferred under pressure through the transfer device 10 to a rotating shaft and be carried therealong externally of the shaft to those points on a shaft or spindle which it is desirable and necessary to lubricate.

The supports 1' are provided with suitable abutment members 16, which may take the form of flat plates. By way of example, each of the members 16 are disposed in the path of or connected to an inwardly projecting arm 15, and arm 15 is directly connected to the transfer device 10 for the purpose to be hereinafter described.

Considering now a specific embodiment of the lubricant transfer device 10, it may be seen from an inspection of Figure 3 that the transfer device 10 includes an annular collar 20. This collar is suitably bored such as to provide one or more conduits 21 disposed parallel to the axis of rotation of the spindle 2. The collar is suitably welded or otherwise fixed to the spindle 2 in such a manner that it is rotatable therewith. The conduits 21 are coupled to the external lubricating line 5 through the medium of a conventional pipe coupling 33. Also provided in the rotatable collar 20 is at least one radially extending conduit 22, which is in communication with the axially disposed conduit 21 and extends to the outer surface of the collar 20.

Surrounding the collar 20 and spaced such that it is centered, as viewed in Figure 3 with respect to the lateral edges of the collar 20 is anti-friction type bearing member 23. This bearing member may be comprised of a bronze collar similar to collar 20 but of considerably less width. This anti-friction bearing 23 is provided with a radial bore 34 which receives in threaded relation an apertured plug 31. The plug 31 is so threaded into the bore 34 that its aperture 31' is in registry with the aperture 22 in collar 20 and a suitable space or gap 30 is effected between the inner end of the plug 31 and the outermost surface of the collar 20 adjacent the flared mouth 22' of conduit 22. This space 30 constitutes a lubricant receiving chamber.

Provided with an annular groove shaped in such a manner as to receive the outer surface of the bearing 23 within its innermost surface is an outer ring member 25. By reason of the projection of plug 31 from the outermost surface of bearing 23 into a suitable recess 35 in member 25, the bearing 23 is retained in stationary and in a slightly spaced relation with respect to the collar 20 and in fixed relation with respect to the outermost surrounding ring member 25. The complementary shaped annulus in the inner surface of ring 25 which receives the outermost surface and edges of bearing 23 maintains the bearing 23 in proper axial position with respect to the innermost collar 20.

The outermost ring 25 is further provided with a radially extending passage 32 which receives at its outermost end a conventional pipe coupling member 14 in turn connected with the conduit 19 as disclosed in Figure 1. Thus, lubricant passed through the conduit 19 will be discharged into the port or conduit 32 in ring 25 to plug 31, then into the lubricant receiving chamber 30.

As has been best described it will be apparent that the conduit 19 will be in constant communication with passage 32 in outer ring 25 and also with the axial bore 31' in the plug 31. Thus the enlarged space 30 as well as the above-mentioned passages will be constantly full of pressurized lubricant from pump P. Because of the slight space between the bearing member 23 and the inner collar 20, the lubricant may escape to a certain degree from the chamber 30 and thus lubricate the abutting surfaces of the collar 20 and bearing 23, the former a rotating element, the latter a stationary element. In addition, since passage 22 is a single radial bore, it will be observed that once during revolution of the spindle, the bore will communicate with the bore 31' in plug 31. Thus once each revolution, a pulse of lubricant is caused to pass into the passage 22 and passage 21 and from thence into the outer end of the spindle through conduit 5.

In some cases, it may be desirable to maintain a constant supply of lubricant to the spindle heads. In such a case, the plug 31 and its aperture 31' would communicate with chamber 30. In this event instead of being merely a radial bore, chamber 30 would be in the form of a circumferential groove extending completely around the inner surface of the bearing member 23. Similarly, the enlarged recess 22' in collar member 20 would be an inner circumferential groove extending completely around the outer surface of this member and in registry with the circumferential groove 30. Thus, in effect, there is defined an annular chamber between the outer surface of collar 20 and the inner surface of the bearing member 23 which would be in constant communication with the source of lubricant and therefore constantly filled with pressurized lubricant. Further, in view of the communication of passage 22 with the constantly filled annular chamber, it, as well as passage 21 and conduit 5, will be constantly supplied with lubricant.

In order to prevent leakage of the lubricant from between the facing surfaces of the outermost ring 25 and the bearing member 23, a series of suitable annular Chevron packing rings 24 are provided to either side of the bearing member 23. These packing rings 24 are maintained in their proper place by means of a pair of retainer members 26 and 27 which are disposed to either side and are in abutment with the vertical walls of the outer ring 25. Suitable bolts 27' pass through the ring 25 parallel to the axis of rotation of the shaft and by means of nuts 28, the retainer members 26 and 27 may be secured into tightly interfitting relation within a suitably disposed annular recess 28' provided in the side wall of outer ring 25.

Referring briefly to Figure 1, it may be seen that some means must be provided to prevent rotation of collar 25 with respect to the spindle 2 or innermost collar 20, since the inherent friction between the respective concentric parts would tend to rotate the outermost ring 25. While it is true the conduit 19 would tend to prevent such rotation, it is believed advantageous that other additional stop means be provided to prevent such undesired rotation to thus relieve the conduits of any undue stress or strain which would tend to rupture the same, thus disrupting the entire system. Accordingly, the ring 25 may be provided, as indicated in Figure 1, with the diametrically projecting arm 15 which, as has been described, is in engagement with the stop member 16 provided on the laterally extending arms 1'. Thus, rotation of the outermost ring 25 is prevented since the stop is so positioned as to be in the path about which the arm 15 would tend to rotate.

It is to be noticed that in the particular embodiment of the invention now being considered, the packing rings 24 are disposed to either side of the bearing member 23. This arrangement assures that lubricant which might escape from the chamber 30 will be adequate to lubricate the inner surface of bearing 23 and the outer surface of collar 20 such as to maintain as relatively friction-free surface-to-surface contact between the collar 20 and the bearing 23 and prevent seizing or gulling therebetween.

As clearly indicated in Figure 1, all of the lines emanating from the transfer device 10 are external of the spindle except those which may be incorporated in the spindle head itself. Thus, cleaning of the lines is greatly facilitated by the use of conventional pipe couplings. Hence removal and replacement of the parts with standard tools is a task involving very little work.

As to those lines 9 and 21 which may be disposed internally of the spindle head 3 and the collar 20 it is to be noted that plug members 13 and 36, respectively, are provided at the opposite ends of the ports to which the conduits 5 and 7 may be connected. Thus, it is apparent that by removal of the plugs 13 and 36 and couplings 12 and 33, any instrument of proper size may be inserted within the passages 9 and 21 and be pushed through so as to exhaust any dirt therein outward in the direction of the coupling members 12 and 33. So also may the lines 5, 7 and 7', as well as the distributing block 6 be readily cleaned. All that is required is that the lines be removed and suitable pressure, such as air pressure and like, applied whereby the lines will be cleared of obstructions. A plug 13' for the lines 11 on a spindle head can also be removed and lines 11 cleared in a manner aforedescribed.

Considering another important advantage of the apparatus disclosed, it is to be noted that the device is readily applicable to spindle heads or shafts which are not ordinarily provided with a lubricating system and which may for highly efficient operation require such an installation. In this respect it is to be noted that the collar member 20 may be formed of complementary, axially split halves placed around a shaft of given size. Subsequent welding and polishing operations will effect a complete ring. A similar arrangement is made for the outermost ring 25. This ring may be made in two parts in such a manner as to permit positioning thereof around the collar 20. Bearing member 23 may also be inserted as two halves while Chevron packing rings 24 of soft material may include a single diametric separation point whereby the rings may be distorted and placed around the collar 20. By arrangement of the packing rings 24 such that the points of separation are staggered with respect to each other a tight and complete oil seal is effectively produced.

By reason of the external positioning of the outlet lines which direct the lubricating fluid or the like to the distribution block 6 it is necessary only to fasten the same by any suitable means to an existing shaft or spindle.

The only machining operation which would be required in order to enable proper lubrication of a shaft or any other rotatable element is that which would involve drilling or milling of longitudinally extending bores or conduits 9 in the spindle head of the herein disclosed installation, a relatively simple operation which might in most instances be performed by hand equipment. A similar arrangement is effective for the production of the diametrically arranged ports 11 as may be seen by an inspection of Figure 4. These bores or ports may be drilled diametrically and the ends closed by plug members 13', which are substantially identical with the plug members 13 used in closing at least one end of the longitudinally extending oil passages 9.

An alternative for construction of the ports within the spindle head is shown in Figures 6 and 7 and would be carried out by the expedient of milling out U-shaped passages 60 in the outer periphery of the spindle head. Such passages would be positioned in the same fashion as the drilled passages 9 and would be connected internally to the slippers 4 by means of passages 11 which would be effected in the manner indicated in Figure 4. A suitable cover plate 61 could then be placed and welded or otherwise fastened over the opened U-shaped grooves to thus in effect create a closed port carried within the spindle head 3. Such an arrangement as clearly seen in Figure 7 would eliminate costly machining and at the same time provide a minimum of closed ports which might be opened for inspection. The plug members would be applied in the same manner as disclosed in Figure 4. Of course, simple external lines could be applied to the spindle head much the same as they are applied in the illustrative installation to the spindle 2.

Referring now to in particular to Figure 5, a second embodiment of lubricant transfer device is disclosed. In this particular embodiment the transfer device 10 includes a split collar member 43 welded in two halves to the spindle 2. The collar member includes a short diametrically extending oil port 44' and a single axially extending oil port 44. Port 44 is in communication with a centralized radial bore 46' of an annular bronze central spacer or anti-friction bearing member 46, bore 46' registering with the oil port 44'. Suitable packing rings 48 held in place by properly shaped lantern rings 47 and 49 are provided whereby the seal is effected to either side of the central bronze spacer member 46. Surrounding the sealing means in concentric relation with respect to the innermost collar 43 is an outer ring 45. Ring 45 includes a diametrically extending bore 55 in communication with bore 46' provided in the bronze spacer member 46. Oil or lubricant emitted through line 19 and coupling 14 may pass through bore 55 in the outermost, stationary ring 45, through the spacer member 46 to the port 44'. From thence the oil would pass through the port 44 outwardly of the collar 43 to the coupling 33 and to distribution line 5. It is to be noted that the spacer member 46 is rendered stationary with respect to the collar 43 by fixing its outer edges to the outer ring 45 as by welding or any other suitable means. The outer ring 45 is held stationary in the same manner as described previously in connection with outer ring 25, i.e., by engagement of a suitable diametrically extending arm 15 in engagement with a stop member 16 as shown in Figure 1. It will be seen then that the spacer member 46, as described, defines an annular member having inner and outer peripheral grooves 46″ and 46‴, respectively. These two peripheral grooves are interconnected by bore 46′.

Suitable back-up or retainer means 51 and 52 are provided which act on lantern rings 49 to maintain the seal rings 48 in proper position to either side of the spacer member 46. These retaining rings 51 and 52 which also serve as bearings take the form of annular members having a generally L-shaped cross-sectional configuration wherein the vertical dimension of the shorter leg of the L is substantially the same as that of lantern ring 49. Thus, it may be seen clearly in Figure 5 that the annular retainer and bearing members 51 and 52 slip within the aperture defined by the innermost wall of ring 45 and the outermost wall of the collar 43 to effectively press against lantern rings 49 thus assuring a complete seal. Bolt means 53 and 54 are inserted through suitable apertures in the spaced retainer members 51, 52 and are engageable with a suitably threaded aperture provided in the outermost ring 45. Thus, the retainer members 51 and 52 are properly maintained in their proper spaced positions.

In order to assure that the outermost assembly comprising retainer members 51 and 52, ring 45, etc. are positioned transversely, as shown in Figure 4, and in the proper relation with the innermost collar 43, a pair of annular split ring members 57 are provided. The members 57 have a diameter of such a dimension that their outer peripheral dimension is greater than the peripheral dimension of the innermost collar 43. The parts of the members 57 which project above the outer periphery of the innermost collar 43 serve as guides to prevent undesired lateral movement, as seen in Figure 5, of the outermost assembly with respect to the innermost collar 43. It will be seen that the disclosed system provides constant lubrication to the spindle heads by reason of the fact that the annular channels 46″ and 46‴ are always connected by the bore 46′ and thus passages 55 and 44′ are always filled with lubricant. Should it be desired that the lubricant feed be of a pulsating type, it will be appreciated that the chamber defined within the channel 46‴ would be simply a diametric bore. In other words, the lubricant would be discharged therein only when the bore registers with passage 44′ or once each revolution.

Thus, it may be seen there is disclosed a simple lubricating system and lubricating transfer device within the system which efficiently applies oil or lubricating fluid under pressure from a stationary source to a rotating spindle or shaft and thence to any desired point on the apparatus. The system and means disclosed may be readily applied to existing installations requiring a minimum amount of machining and other expensive procedures.

It is to be noted further that the instant system is so constructed as to be readily knocked down for cleaning and that such cleaning operation would require a minimum of time. The effectiveness of the system is such that equipment upon which it will be installed would be enhanced in efficiency and operating conditions thus reducing maintenance cost.

As has been stated above, the instant system is described in terms of a particular installation, but it will be readily appreciated that the system can be installed in any environment where lubrication of a rotating element from a stationary source of supply is required. Accordingly, the invention is limited only by the scope of the following appended claims, wherein, what is claimed is:

1. A lubricating system for a rotating element comprising means associated with said element and rotatable therewith, a stationary means surrounding said first-mentioned means and concentric therewith, both of said means being provided with passages, anti-friction means disposed intermediate said stationary and said rotating means and fixedly secured to said stationary means, said anti-friction means having chamber and bore means in open communication with each other, said chamber and bore means also serving to place the passages in both said stationary and rotating means at least periodically in open communication with each other, the chamber means of the anti-friction means also being disposed adjacent the rotating means and defining a lubricant receiving chamber, sealing elements disposed adjacent said anti-friction means and intermediate said rotating and stationary means, lubricant outlet means carried by said rotating element and in open communication with the passages in the rotating means associated therewith whereby lubricant under pressure may pass from a stationary source of pressure and supply to a desired point on said rotating element, said outlet means also being comprised of conduits and ports readily openable to the atmosphere to facilitate the cleaning thereof.

2. A lubricating system as defined in claim 1 wherein said outlet means includes ports having at least one end closed with a removable plug.

3. A lubricating device for a rotatable element comprising means fixed to and rotatable with said element, a second means surrounding and located in a stationary position with respect to said first mentioned means, said stationary means including a lubricant passage, and an apertured bearing means, said bearing means being in supporting relation with respect to said rotatable element and including apertured means locking said bearing means in non-rotatable relationship with respect thereto, a lubricant passage in said first mentioned means in communication with the apertured locking means included in said apertured bearing means, said last-mentioned lubricant passage including at least one outlet, and external conduit means on said rotatable element connected to said outlet whereby lubricant under pressure may be transferred from a stationary source through said lubricating device to a predetermined point on said rotatable element.

4. A lubricating device for a rotatable element comprising means fixed to and rotatable with said element, a second means surrounding and stationary with respect to said first mentioned means, bearing means disposed between said first mentioned means and said second mentioned means, sealing means also disposed between said first mentioned means and said second mentioned means, said bearing means including a lubricant transfer chamber disposed between said first and second mentioned means, means locking said bearing means in non-rotatable relation with respect to said rotatable element, a lubricant passage in said first mentioned means, a lubricant passage in said second mentioned means, said lubricant passages and said lubricant transfer chamber being in communication with each other and said first-mentioned lubricant passage including at least one outlet on said rotatable element, said outlet being in communication with a conduit means located adjacent the outer peripheral edge of said rotatable element, whereby a fluid under pressure may be transferred from a stationary source of pressure through said lubricating device to a desired point on said rotatable element, said outlet being so disposed on said rotatable element as to be readily accessible during the cleaning thereof.

5. In a lubricating device of the type described for transferring lubricant under pressure from a stationary source to a predetermined point on a rotating shaft, the combination of a collar fixed to and rotatable with said shaft at a point adjacent a stationary source of lubricant supply, a stationary ring means located in circumferential, surrounding relation with respect to said collar, a sealing means including annular packing rings disposed in sealing relation with respect to said collar and said stationary ring means, said ring means including a bearing in contact with said collar, an apertured plug locking said bearing in fixed relation with respect to said ring means, a lubricant passage in said collar disposed parallel to the axis of rotation of said shaft, said passage also being in communication with said apertured plug, a lubricant passage in said stationary ring means in communication with the aperture in said plug, said first mentioned lubricant passage in said collar including an outlet means and conduit means disposed on said shaft and connected to said last mentioned outlet means for permitting flow of said lubricant to a desired point on said shaft.

6. A lubricating device as claimed in claim 5 including removable plug means sealing said last mentioned passage in said collar from the atmosphere which plug means upon removal permit ready access to said passage during the cleaning thereof.

7. In an external lubricating device of the type described for a rotating spindle and the like the combination of stationary means including a source of lubricant supply, conduit means connecting said source of lubricant supply to said spindle, said conduit means being generally disposed in external relation to said spindle, said conduit means including slip ring means for transferring lubricant from the stationary lubricant supply source to said rotating spindle, said slip ring means comprising a collar welded in fixed relation to said spindle, ring means disposed in concentric and surrounding relation with respect to said collar, bearing means disposed between said collar and said ring means, said bearing means being fixed with respect to said ring means and in bearing relation with respect to the rotating collar, apertured plug means fixing said bearing means with respect to said ring means, said ring means and said collar each having lubricant passages in communication with said apertured plug and bearing means and each other, sealing means surrounding said collar and in engagement with said ring means, said lubricant passages comprising an inlet means and outlet means, a conduit in communication with the said outlet means and carried by said spindle said conduit terminating at a point closely adjacent the outer periphery thereof, whereby fluid under pressure from the stationary lubricant supply source may be transferred to a predetermined point on said rotating spindle.

8. A lubricating device for transmitting a lubricant from a stationary source of supply under pressure to desired points on a rotating spindle including a collar member surrounding a portion of said spindle and fixed for rotation therewith, said collar member having a bore and an opening at the outer peripheral surface thereof in communication with said bore, a bearing means surrounding said collar member and including an aperture registerable with the opening in said collar member, said bearing means being provided with an apertured plug forming said registerable aperture and having an end projecting beyond the outer surface of said bearing means, seal rings disposed to either side of said bearing means, an outer and stationary ring means surrounding said bearing means and said seal rings, said stationary ring means including a radial bore having an enlarged portion adjacent its inner surface to receive the projecting end of said apertured plug to lock said bearing means to said ring means, retainer means carried by said ring means for maintaining said seal rings in sealing relation with respect to said collar member and said stationary ring means, a conduit leading from said stationary source of supply and communicating with said radial bore in said stationary ring means, an outlet conduit in communication with the bore in said collar member, whereby the lubricant may pass from said stationary ring means to said rotating collar member and from said collar member to a desired point on said spindle.

9. A lubricating device as described in claim 8, wherein said outlet conduit in communication with said bore in said collar member terminates adjacent the end of the spindle in a plurality of internal ports, said ports being provided with means for permitting ready access into the interior thereof for removal of accumulated foreign substances therein.

10. A lubricating system for a rotating element comprising means associated with said element and rotatable therewith, a stationary means surrounding said first-mentioned means and concentrically disposed in spaced relationship thereto, both of said means being provided with passages, anti-friction bearing means disposed intermediate said rotatable and stationary means and fixedly secured to said stationary means, said anti-friction bearing means being provided with at least one chamber and a bore in open communication therewith, said chamber and bore being at least periodically in open communication with the passages in said stationary and rotatable means, said chamber also being located adjacent said rotatable means and defining a lubricant-receiving chamber, sealing elements disposed adjacent said bearing means and intermediate said rotatable and stationary means, outlet means carried by said rotating element and in open communication with the passages in the rotatable means associated therewith, said outlet means including conduit means for carrying a lubricant to a desired point on said rotating element whereby lubricant under pressure may pass from a stationary source of pressure to said desired point on said rotating element and means readily exposing said conduit means to the atmosphere to facilitate the cleaning thereof.

11. A device as set forth in claim 10 wherein the lubricant receiving chamber of said bearing means comprises an annular channel, and wherein said anti-friction bearing means is provided with another annular channel disposed adjacent said stationary means, with the bore of said bearing means serving to place the said channels in open communication with each other.

References Cited in the file of this patent

UNITED STATES PATENTS

| 423,580 | Warrington | Mar. 18, 1890 |
| 1,257,258 | Lemp | Feb. 19, 1918 |

FOREIGN PATENTS

| 705,461 | Germany | Apr. 29, 1941 |
| 643,316 | Great Britain | Sept. 15, 1950 |
| 809,871 | Germany | Aug. 2, 1951 |
| 902,337 | Germany | Jan. 21, 1954 |

UNITED STATES PATENT OFFICE

CERTIFICATE OF CORRECTION

Patent No. 2,925,885                  February 23, 1960

Walter A. White

It is hereby certified that error appears in the printed specification of the above numbered patent requiring correction and that the said Letters Patent should read as corrected below.

Column 4, line 58, for "during revolution" read -- during each revolution --.

Signed and sealed this 1st day of November 1960.

(SEAL)
Attest:

KARL H. AXLINE
Attesting Officer

ROBERT C. WATSON
Commissioner of Patents